US008934738B2

(12) United States Patent
Nakase (10) Patent No.: US 8,934,738 B2
(45) Date of Patent: Jan. 13, 2015

(54) IMAGE PROCESSING APPARATUS AND METHOD FOR CONTROLLING THE SAME

(71) Applicant: Canon Kabushiki Kaisha, Tokyo (JP)

(72) Inventor: Yuichi Nakase, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 13/727,012

(22) Filed: Dec. 26, 2012

(65) Prior Publication Data

US 2013/0170771 A1 Jul. 4, 2013

(30) Foreign Application Priority Data

Dec. 28, 2011 (JP) ................................. 2011-289479

(51) Int. Cl.
*G06K 9/54* (2006.01)
*G06F 17/30* (2006.01)

(52) U.S. Cl.
CPC .... *G06F 17/30244* (2013.01); *G06F 17/30247* (2013.01); *G06F 17/3028* (2013.01)
USPC ........................................................ 382/305

(58) Field of Classification Search
USPC ................................................. 382/233, 305
See application file for complete search history.

(56) References Cited

U.S. PATENT DOCUMENTS

| 7,634,158 B2 | 12/2009 | Nakase |
| 7,756,362 B2 | 7/2010 | Nakase |
| 7,949,209 B2 | 5/2011 | Nakase |
| 8,294,789 B2 | 10/2012 | Nakase |
| 2012/0038792 A1 | 2/2012 | Nakase |

FOREIGN PATENT DOCUMENTS

| JP | 2000-222576 | 8/2000 |
| JP | 2004-362121 | 12/2004 |

*Primary Examiner* — Duy M Dang
(74) *Attorney, Agent, or Firm* — Fitzpatrick, Cella, Harper & Scinto (57) ABSTRACT

An image processing apparatus stores a database which includes first analytical information obtained by analyzing an image existing on a recording medium, a matching dictionary including information extracted from a camera dictionary with an identifier added to each subject, and file information relating information about each subject existing in the image file with the identifier, and checks consistency between the information in the matching dictionary and information in the camera dictionary, and reconstructs the database retrieve of the database is possible to be performed, in a case where any inconsistency is found as a result of the consistency confirming.

25 Claims, 7 Drawing Sheets

| ID | NICKNAME | FEATURE DATA |
|---|---|---|
| A | Kobayashi | FEATURE OF ID OF A |
| B | Nakamura | FEATURE OF ID OF B |
| C | Sato | FEATURE OF ID OF C |
| D | Tanaka | FEATURE OF ID OF D |

FIG. 6

| ID | NICKNAME | FEATURE DATA |
|---|---|---|
| A | Sato | FEATURE OF ID OF A |
| B | Tanaka | FEATURE OF ID OF B |
| C | Watanabe | FEATURE OF ID OF C |
| D | Yamada | FEATURE OF ID OF D |

IMAGE PROCESSING APPARATUS AND METHOD FOR CONTROLLING THE SAME

BACKGROUND OF THE INVENTION

1. Field of the Invention

The present invention relates to an image processing apparatus and a method of controlling the image processing apparatus, and more particularly, to an image processing apparatus which analyzes attribute information given to each image file and manages images based on the attribute information compiled into a database and a method of controlling the image processing apparatus.

2. Description of the Related Art

Conventionally, in an information processing apparatus such as an image processing apparatus, database retrieve is performed using key words.

An information retrieve apparatus described in Japanese Patent Application Laid-Open No. 2004-362121 allows a user to enter any desired key word related to a desired program to be retrieved and to retrieve programs which match the key word from an electronic program guide by using a string search. Furthermore, the user can send the key word to a server on the Internet, receive an extended key word similar to the key word, and retrieve the electronic program guide by a string retrieve using the extended key word.

Also, a person identifying apparatus described in Japanese Patent Application Laid-Open No. 2000-222576 is arranged to recognize persons registered in face dictionary data, in a photograph image.

However, for example, key words, if stored in a database as with Japanese Patent Application Laid-Open No. 2004-362121, will cause enlargement of file sizes in the database. In particular, if the number of images to be processed in an image processing apparatus such as a digital camera or smart phone largely increases, the database will enlarge the size thereof greatly and a database retrieve process will take a great deal of time. Also, an embedded image processing apparatus such as a digital camera or cell phone does not have an enough amount of data processing capacity and built-in memory capacity, and thus there is demand to reduce processing time required for database retrieve while keeping the database from size increase thereof.

Furthermore, an image processing apparatus which does not have so higher data processing ability might encounter the inconvenience of being unable to perform other processes (e.g., a photographing process) during a database update (reconstruction).

SUMMARY OF THE INVENTION

An aspect of the present invention is to solve all or at least one of the above problems.

Also, according to an aspect of the present invention, an image processing apparatus stores a first dictionary relating information of a name of a subject and feature information indicating a feature of the subject to each other, stores a database including a second dictionary in which an identifier is added to at least one of the information of the name of the subject and the feature information indicating a feature of the subject included in the first dictionary, and file information which is information about an image file and relates information about the subject existing in the image file with the identifier, checks consistency between the information in the second dictionary and the information in the first dictionary and, if any inconsistency is found, reconstructs the database when retrieve of the database is possible to be performed.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An embodiment of the present invention will be described below with reference to the accompanying drawings. Although in the embodiment of the present invention, a digital camera will be described as an example of an image processing apparatus, the present invention is not limited to this, and may be applied, for example, to a printer, cell phone, or portable terminal serving as an image processing apparatus.

In the embodiment of the present invention, a digital camera capable of recording moving images and still images will be described as an example of an image processing apparatus. Also, the image processing apparatus according to the embodiment of the present invention is provided with a GPS or other position detection function and configured to be able to record detected position information in files.

Incidentally, in addition to digital cameras, the present embodiment is also applicable to cell phones, smart phones, tablet PCs, and personal computers.

Figure 1:
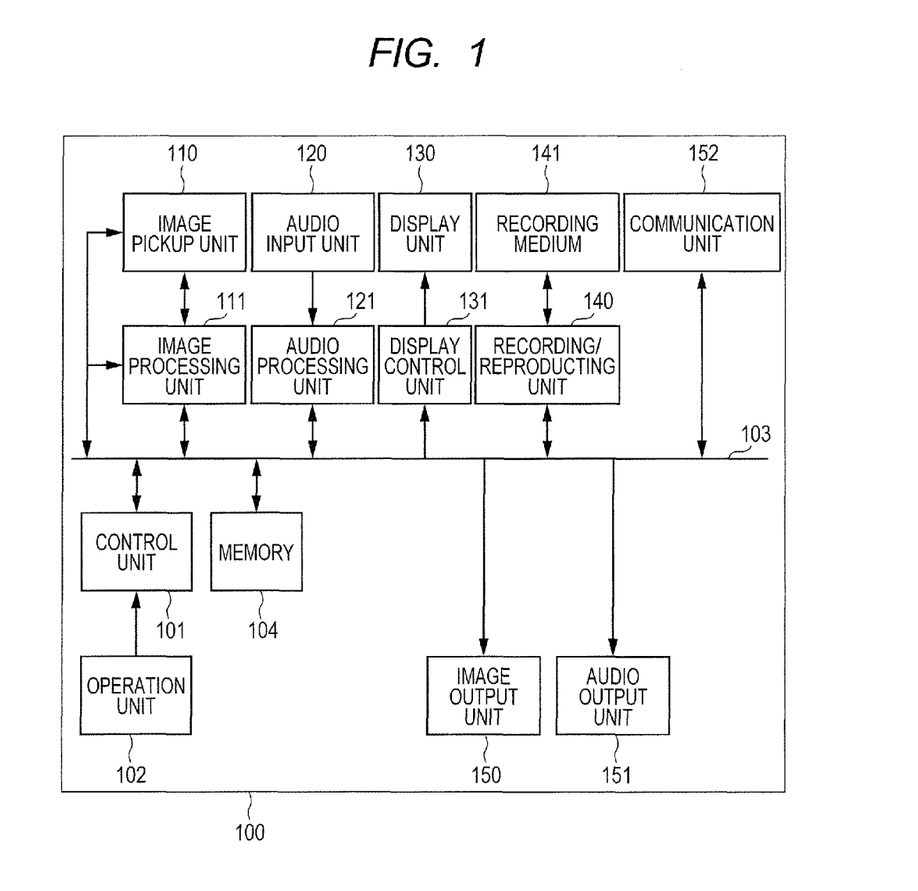
FIG. 1 is a block diagram showing an exemplary schematic configuration of an image processing apparatus (digital camera) according to an embodiment of the present invention.

FIG. 1 is a block diagram showing an exemplary schematic configuration of an image processing apparatus (digital camera) 100 according to an embodiment of the present invention.

In FIG. 1, a control unit 101 includes, for example, a CPU (MPU) and built-in memories such as a volatile memory (DRAM or SRAM) and non-volatile memory. By executing programs stored, for example, in the non-volatile memory and related to various processes, the control unit 101 controls various blocks constituting the image processing apparatus 100 and controls data transfer among the constituent blocks. Also, in accordance with operation signals from an operation unit 102 arranged to accept user actions, the control unit 101 controls the blocks constituting the image processing apparatus 100. Also, the control unit 101 analyzes an image obtained by an image processing unit 111 described later and controls the blocks constituting the image processing apparatus 100 according to analysis results.

The operation unit 102 includes switches, for example, a power button, a mode selector switch, a still image recording button, a moving image recording start/stop button, a zooming button, an autofocus button, which are used to enter various commands related to operation of the image processing apparatus 100. Furthermore, the operation unit 102 includes, for example, a menu display button, and an enter button as well as a cursor key, a pointing device, and a touch panel. When any of the buttons, key, and the like is operated by the user, the operation unit 102 sends an operation signal to the control unit 101.

A bus 103 is a universal bus used to sent various data, various control signals, various command signals to the blocks constituting the image processing apparatus 100.

A memory 104 temporarily stores an image signal and audio signal obtained, respectively, from the image processing unit 111 and an audio processing unit 121, as files.

An image pickup unit 110 controls an amount of light using an iris to convert an optical image of the subject formed by a lens into an image signal using an image pickup element such as a CCD sensor or CMOS sensor, subjects the image signal to analog to digital conversion, and sends the digital image signal to the image processing unit 111.

The image processing unit 111 applies image processing including an image quality adjustment process to the digital image signal sent from the image pickup unit 110 to adjust white balance, color, brightness and the like on the basis of set values. Then, the image processing unit 111 sends the image signal subjected to the image processing to the memory 104 as well as to a image output unit 150 and display control unit 131 (described later) under the control of the control unit 101.

According to the present embodiment, for example, the image pickup unit 110 has an "optical zoom" function and "optical vibration-proof" function while the image processing unit 111 has a "digital zoom" function and "electronic vibration-proof" function. The "optical zoom" function and "digital zoom" function are the functions of enlarging/reducing an image in accordance with a user operation. Also, the "optical vibration-proof" function and "electronic vibration-proof" function are the functions of preventing image vibration caused by vibration of a body of the image processing apparatus 100. These functions are used simultaneously, alternately, or separately under the control of the control unit 101.

Specifically, the "optical zoom" function is the function of moving a lens in the image pickup unit 110 in accordance with a zoom key on the operation unit 102 being operated by the user, and thereby enlarging/reducing a subject's optical image to be captured. On the other hand, the "digital zoom" function is a process whereby the image processing unit 111 generates an image signal by cutting out and enlarging a part of an image generated by the image pickup unit 110, in accordance with the zoom key on the operation unit 102 being operated by the user. Also, the "optical vibration-proof" function is the function of calculating an amount of movement of the lens on the basis of an acceleration signal from a vibration detection unit (not shown) to movie the lens, and thereby preventing vibration of the image to be acquired. On the other hand, the "electronic vibration-proof" function is the function of adjusting a position of an image signal acquired by the image pickup unit 110, on the basis of the acceleration signal from the vibration detection unit (not shown), and thereby preventing vibration of the image. Also, the "electronic vibration-proof" function can also be realized by shifting a read position of the image pickup element in the image pickup unit 110 on the basis of the acceleration signal from the vibration detection unit (not shown). These functions are well known techniques, and so detailed description thereof will be omitted.

Referring to FIG. 1, an audio input unit 120 collects (picks up) sounds around the image processing apparatus 100 using, for example, a built-in nondirectional microphone or an external microphone connected via an audio input terminal and generates an audio signal. Then, the audio input unit 120 subjects the generated audio signal to analog to digital conversion, and sends the digital audio signal to the audio processing unit 121.

The audio processing unit 121 performs audio-related processing including a level optimization process on the digital audio signal sent from the audio input unit 120. Then, the audio processing unit 121 sends the audio signal subjected to the audio processing to the memory 104 under the control of the control unit 101.

Note that the image processing unit 111 and audio processing unit 121 read out the image signal and audio signal temporarily stored in the memory 104 as files, encode the image signal and audio signal, and thereby generate a compressed image signal and compressed audio signal. Then, the control unit 101 sends the compressed image signal and compressed audio signal to a recording/reproducing unit 140.

In FIG. 1, a display unit 130 is a display device such as a liquid crystal display, an organic EL display or electronic paper.

Under the control of the control unit 101, the display control unit 131 displays an image based on the image signal sent from the image processing unit 111 as well as an operation picture screen (menu picture screen) for use to operate the image processing apparatus 100, on the display unit 130.

The recording/reproducing unit 140 stores the compressed image signal and compressed audio signal generated respectively by the image processing unit 111 and audio processing unit 121 as well as various data including other photographing control data for photographing on a recording medium 141 as files. On the other hand, when the audio signal is not compression-encoded, the control unit 101 sends the audio signal generated by the audio processing unit 121 and the compressed image signal generated by the image processing unit 111 to the recording/reproducing unit 140 to be recorded as files on the recording medium 141. Also, the recording/reproducing unit 140 reads (reproduces) the compressed image signal, compressed audio signal or audio signal, or various data and programs stored on the recording medium 141. Then, under the control of the control unit 101, the recording/reproducing unit 140 sends the compressed image signal and compressed audio signal thus read out, to the image processing unit 111 and audio processing unit 121.

The recording medium 141 may be built into the image processing apparatus 100 or configured to be removable from the image processing apparatus 100 as long as the recording medium 141 can record the compressed image signal, compressed audio signal, audio signal and various data generated by the image processing apparatus 100. Examples of the recording medium 141 include every type of recording medium such as a hard disk, optical disk, magneto-optical disk, CD-R, DVD-R, magnetic tape, non-volatile semiconductor memory and flash memory.

The image processing unit 111 and audio processing unit 121 temporarily stores the compressed image signal and compressed audio signal, respectively, as files in the memory 104, and then decode the signals according to predetermined procedures. Then, the image processing unit 111 sends the decoded image signal to the image output unit 150 and display control unit 131 under the control of the control unit 101 while the audio processing unit 121 sends the decoded audio signal to an audio output unit 151 under the control of the control unit 101. Incidentally, if an audio signal is recorded in a non-compressed form on the recording medium 141, the control unit 101 sends the audio signal directly to the audio output unit 151.

Referring to FIG. 1, the image output unit 150 is arranged, for example, to be an image output terminal and configured to send image signals to display an image on a connected external display and the like.

The audio output unit 151 is arranged, for example, of an audio output terminal and configured to send audio signals to generate audio through a connected earphone or speaker. Incidentally, the audio output unit 151 may be a speaker built into the image processing apparatus 100 and configured to output audio based on audio signals.

The image output unit 150 and audio output unit 151 may be provided as an integrated terminal such as an HDMI (High-Definition Multimedia Interface) (registered trademark) terminal.

In FIG. 1, a communication unit 152 takes charge of communications between the image processing apparatus 100 and external equipment and sends and receives data such as image signals, audio signals, compressed image signals and compressed audio signals. Also, the communication unit 152 sends and receives control signals for photographing, such as a photographing start command and photographing end command as well as other information. The communication unit 152 is, for example, a wireless communications module such as an infrared transmission module, Bluetooth (registered trademark) communications module, wireless LAN communications module, wireless USB, and GPS signal receiver module.

Now, normal operation of the image processing apparatus 100 according to the present embodiment will be described.

With the image processing apparatus 100 according to the present embodiment, when the user presses the power button on the operation unit 102, a start command is issued from the operation unit 102 to the control unit 101. Upon receiving the command, the control unit 101 causes a power supply unit (not shown) to supply power to the blocks constituting the image processing apparatus 100.

When power is supplied, the control unit 101 confirms, based on a command signal from the operation unit 102, which mode the mode selector switch of the operation unit 102 is positioned in, for example, still image photographing mode, moving image photographing mode, or reproduction mode.

In the still image photographing mode, the image processing apparatus 100 shoots a still image of a subject when the user presses the still image recording button of the operation unit 102 in a photographing standby state. Then, the image processing apparatus 100 records the compressed image signal based on the image signal obtained by the still image photographing on the recording medium 141 as a file. Subsequently, the image processing apparatus 100 enters a photographing standby state again.

In the moving image photographing mode, the image processing apparatus 100 shoots a moving image of a subject when the user presses the moving image recording button of the operation unit 102 in a photographing standby state. Then, the image processing apparatus 100 records the compressed image signal based on the image signal obtained during the moving image photographing as well as the audio signal obtained during the moving image photographing or the compressed audio signal based on the audio signal on the recording medium 141 as files. Then, the image processing apparatus 100 finishes the moving image photographing when the user presses the moving image recording stop button of the operation unit 102. Subsequently, the image processing apparatus 100 enters a photographing standby state again.

In the reproduction mode, the image processing apparatus 100 reproduces the compressed image signal and compressed audio signal or audio signal of a file selected by the user from the recording medium 141. Then, the image processing apparatus 100 displays the image based on the compressed image signal on the display unit 130 and outputs the audio based on the compressed audio signal or audio signal through the audio output unit 151.

Also, by operating the operation unit 102, the user can enter a change menu provided on the image processing apparatus 100, select an item, and change a set value corresponding to the selected item. Examples of change menu items include date information, date/time information, time difference information, area settings, user information, photographing mode and image format held by the image processing apparatus 100.

First, details of the still image photographing mode will be described below.

When the still image photographing mode is set via the operation unit 102, first the control unit 101 causes the blocks constituting the image processing apparatus 100 to enter a photographing standby state as described above. In the photographing standby state, the image processing unit 111 sends the image signal to the display control unit 131 under the control of the control unit 101 to display an image on the display unit 130 based on the image signal. The user prepares for still image photographing by viewing the image displayed in this way.

In the photographing standby state, when the user presses the still image recording button on the operation unit 102, a still image photographing command signal is issued from the operation unit 102 to the control unit 101. Upon receiving the still image photographing command signal from the operation unit 102, the control unit 101 causes the blocks constituting the image processing apparatus 100 to operate as follows.

The image pickup unit 110 converts the subject's optical image formed by the lens into an image signal using the image pickup element, subjects the image signal to analog to digital conversion, and sends the digital image signal to the image processing unit 111. The image processing unit 111 analyzes subject information of the digital image signal sent from the image pickup unit 110 and performs an image quality adjustment process (white balance, colors, brightness) on the basis of set values and the subject information. Examples of the subject information include a distribution of subject brightness, a distribution of faces, personal authentication information obtained as a result of facial recognition, and a distribution of distances. The image signal processed by the image processing unit 111 is sent by the control unit 101 to the memory 104, image output unit 150, and display control unit 131. By viewing the image displayed on the display unit 130, the user can confirm the resulting still image.

Then, the image processing unit 111 reads out the image signal temporarily stored as a file in the memory 104, generates a compressed image signal by encoding the image signal in a predetermined manner, and outputs the compressed audio signal to the recording/reproducing unit 140. The recording/reproducing unit 140 stores the compressed image signal as a still image file together with attribute information in the recording medium 141 in accordance with the UDF, FAT or other file system. The attribute information includes the subject information described above and settings information of the image processing apparatus 100 as well as external information (position information, a MAC address and the like) acquired from the communication unit 152. When the image processing unit 111 finishes the encoding operation, the control unit 101 sends a control signal to the blocks constituting the image processing apparatus 100, indicating a transition to a photographing standby state, and then returns to the photographing standby state.

Next, details of the moving image photographing mode will be described.

When the moving image photographing mode is set via the operation unit 102, first the control unit 101 sets the blocks constituting the image processing apparatus 100 to a photographing standby state as described above. In the photographing standby state, the image processing unit 111 sends the image signal to the display control unit 131 under the control of the control unit 101 to display an image based on the image signal on the display unit 130. The user prepares for moving image photographing by viewing the image displayed in this way.

In the photographing standby state, when the user presses the moving image recording start button on the operation unit 102, a moving image photographing start command signal is issued from the operation unit 102 to the control unit 101. Upon receiving the moving image photographing start command signal from the operation unit 102, the control unit 101 causes the blocks constituting the image processing apparatus 100 to operate as follows.

The image pickup unit 110 converts the optical image of the subject formed by the lens into an image signal using the image pickup element, subjects the image signal to analog to digital conversion, and sends the digital image signal to the image processing unit 111. The image processing unit 111 performs an image quality adjustment process (white balance, colors, brightness) on the digital image signal sent from the image pickup unit 110, on the basis of set values. The image signal processed by the image processing unit 111 is sent by the control unit 101 to the memory 104 and display control unit 131. Then, the display control unit 131 displays image based on the received image signal on the display unit 130.

On the other hand, the audio input unit 120 converts the analog audio signal obtained through a microphone into digital form, and sends the resulting digital audio signal to the audio processing unit 121. The audio processing unit 121 performs processing including a level optimization process on the digital audio signal sent from the audio input unit 120. The control unit 101 sends the audio signal processed by the audio processing unit 121 to the memory 104.

Then, the image processing unit 111 and audio processing unit 121 read the image signal and audio signal, respectively, temporarily stored in the memory 104 as files, subjects the image signal and audio signal to a predetermined encoding, and thereby generates compressed image signal and compressed audio signal. Then, the control unit 101 forms a data stream by compositing the compressed image signal and compressed audio signal and outputs the data stream to the recording/reproducing unit 140. The recording/reproducing unit 140 stores the data stream as a moving image file on the recording medium 141 in accordance with management by the UDF, FAT or other file system.

When the audio signal is not compressed, the control unit 101 outputs the audio signal generated by the audio processing unit 121 to the recording/reproducing unit 140 together with the compressed image signal generated by the image processing unit 111. Then, the recording/reproducing unit 140 stores the data stream as a moving image file on the recording medium 141 in accordance with management by the UDF, FAT or other file system as described above.

The above operation is continued during the moving image photographing.

Also, while the moving image is being photographed, the control unit 101 sends various control signals to the image pickup unit 110, image processing unit 111 and audio processing unit 121 in accordance with user operations of the operation unit 102 or analysis results of the image signal generated by the image processing unit 111. For example, the control unit 101 sends control signals for lens movement or iris adjustments to the image pickup unit 110, and control signals for image and audio adjustments to the image processing unit 111 and audio processing unit 121.

Similarly, while the moving image is being photographed, if the user operates the zoom key on the operation unit 102, the control unit 101 activates the "optical zoom" function of the image pickup unit 110 or the "digital zoom" function of the image processing unit 111. Also, based on the acceleration signal resulting from detection by the vibration detection unit (not shown), the control unit 101 activates the "optical vibration-proof" function of the image pickup unit 110 or the "electronic vibration-proof" function of the image processing unit 111.

Then, when the user presses the moving image recording stop button of the operation unit 102, the operation unit 102 sends a moving image photographing end command signal to the control unit 101. Upon receiving the moving image photographing end command signal from the operation unit 102, the control unit 101 causes the blocks constituting the image processing apparatus 100 to operate as follows.

The image processing unit 111 and audio processing unit 121 stop sending the image signal and audio signal, respectively, to the memory 104. Then, the image processing unit 111 and audio processing unit 121 read a remaining image signal and audio signal, respectively, stored in the memory 104, subjects the image signal and audio signal to predetermined encoding, and thereby generate a compressed image signal and compressed audio signal. Then, the control unit 101 forms a data stream by compositing the last compressed image signal and compressed audio signal and outputs the data stream to the recording/reproducing unit 140. When the audio signal is not compressed, the control unit 101 outputs the audio signal generated by the audio processing unit 121 to the recording/reproducing unit 140 together with the compressed image signal generated by the image processing unit 111.

Then, the recording/reproducing unit 140 stores the data stream as a moving image on the recording medium 141 in accordance with management by the UDF, FAT or other file system. Then, when data stream supply stops, the control unit 101 performs operation control as follows to generate thumbnails.

The recording/reproducing unit 140 reads the compressed image signal from the first frame of the moving image file recorded on the recording medium 141 and sends the compressed image signal to the image processing unit 111. The image processing unit 111 temporarily stores the received compressed image signal in the memory 104, and then decodes the compressed image signal according to predetermined procedures. Next, the image processing unit 111 encodes the obtained image signal in a predetermined manner for thumbnail and thereby generates a compressed thumbnail image signal. Then, the control unit 101 outputs the compressed thumbnail image signal generated by the image processing unit 111 to the recording/reproducing unit 140. The recording/reproducing unit 140 appends the compressed thumbnail image signal to the original moving image file in accordance with the management by under the UDF, FAT or other file system and stores the resulting file on the recording medium 141 together with the attribute information described above. The moving image file generation is completed in this way, and the moving image recording operation stops. When the moving image recording operation stops, the control unit 101 sends a control signal for transiting to a photographing standby state to the blocks constituting the image processing apparatus 100, and then returns to the photographing standby state.

Next, details of the reproduction mode will be described.

When the reproduction mode is set via the operation unit 102, a reproduction command signal is sent from the operation unit 102 to the control unit 101. Upon receiving the reproduction command signal from the operation unit 102, the control unit 101 causes the blocks constituting the image processing apparatus 100 to operate as follows.

The recording/reproducing unit 140 reads out still image files each including a compressed image signal or moving image files each including a compressed image signal and a compressed audio signal or audio signal, recorded on the recording medium 141, by determining a reproduction order on the basis of information, such as a file name and update date/time managed by the file system or the attribute information recorded relatedly to each file. Also, the control unit 101 manages the determined reproduction order in the form of a list in a database stored in the memory 104. Also, the database is recorded on the recording medium 141 for long lasting use, so that it may sometimes be reused.

The control unit 101 sends the read-out compressed image signal and compressed audio signal respectively to the image processing unit 111 and audio processing unit 121. The control unit 101 sends the audio signal to the audio output unit 151 if the audio signal is not compressed.

The image processing unit 111 and audio processing unit 121 temporarily store the compressed image signal and compressed audio signal in the memory 104, and then decodes the compressed signals according to predetermined procedures. Then, the image processing unit 111 sends the decoded image signal to the image output unit 150 and display control unit 131 under the control of the control unit 101 while the audio processing unit 121 sends the decodes audio signal to the audio output unit 151 under the control of the control unit 101. Then, the display control unit 131 displays an image based on the received image signal on the display unit 130 while the audio output unit 151 outputs audio based on the received audio signal through a built-in speaker or connected earphone or speaker.

The image processing apparatus 100 according to the present embodiment records and reproduces still images and moving images as described above.

Next, operation of the image processing apparatus 100 according to the present embodiment in reproduction mode will be described with reference to FIGS. 2, 3, 4, 5, 6, 7, 8 and 9.

When the reproduction mode is set via the operation unit 102, a reproduction command signal is sent from the operation unit 102 to the control unit 101. Upon receiving the reproduction command signal from the operation unit 102, the control unit 101 sends a control signal to the blocks constituting the image processing apparatus 100 on the basis of the reproduction command signal and performs the process illustrated in FIG. 2.

Figure 2:
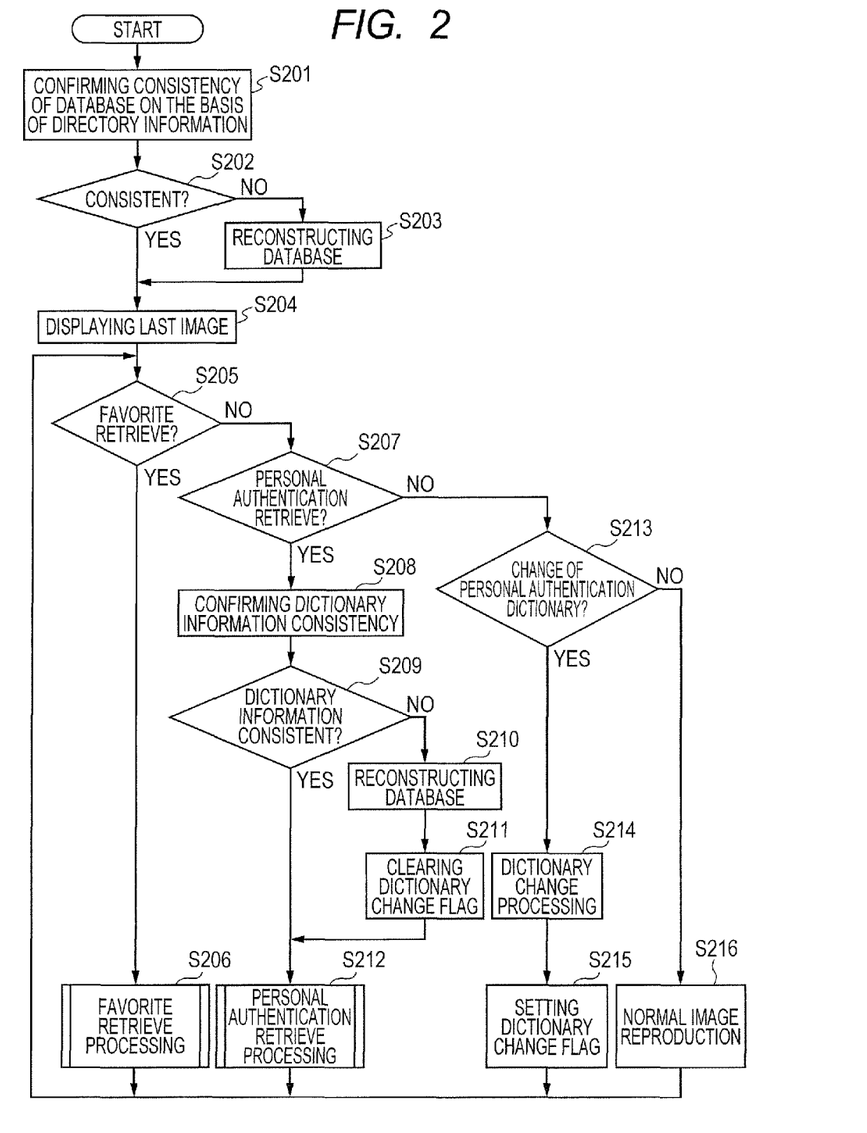
FIG. 2 is a flowchart showing exemplary processing procedures of the image processing apparatus (digital camera) according to the embodiment of the present invention in reproduction mode.

FIG. 2 is a flowchart showing exemplary processing procedures of the image processing apparatus (digital camera) 100 according to the embodiment of the present invention in reproduction mode.

First, in step S201 of FIG. 2, for example, the control unit 101 performs consistency confirming of database files in accordance with directory information.

Now, the database file will be described with reference to FIG. 3.

Figure 3:
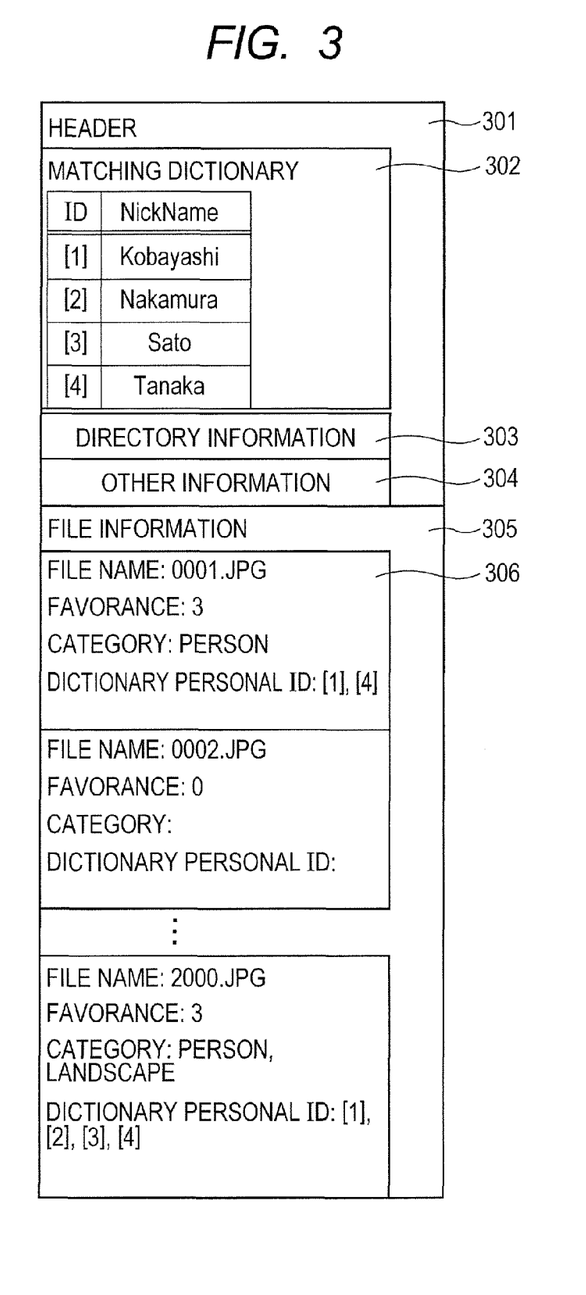
FIG. 3 is a schematic diagram showing an exemplary structure of a database file generated by the image processing apparatus (digital camera) according to the embodiment of the present invention.

FIG. 3 is a schematic diagram showing an exemplary structure of the database file generated by the image processing apparatus (digital camera) 100 according to the embodiment of the present invention.

The image processing apparatus 100 according to the present embodiment has an image retrieve function according to attribute information of the image. In this case, it is conceivable to retrieve an image by reading out the attribute information stored as supplementary information attached to an image from the recording medium 141 into the memory 104 on each image basis and referring to the read-out attribute information, but it requires a great deal of time to read out and analyze all the images each time.

Therefore, according to the present embodiment, attribute information of images once analyzed is stored as a database in the memory 104 as a database, relatedly to identification information of the images such as file names, and then the database is stored in the recording medium 141 as a file independent of the images. Then, beginning with a next retrieve, the database file is read from the recording medium 141 into the memory 104, and retrieves is performed by simply referring to the database file, so that the retrieve can be performed at high speed.

However, since the attribute information is stored both in the image file and database file, consistency confirming becomes necessary in order to detect and correct a mismatch between the image file and database file, caused by alternation of the database file or change of the image file.

Referring to FIG. 3, a header 301 includes matching dictionary 302 described later, directory information 303, and other information 304. The other information 304 includes version information of the database file, a check sum, and each file information 306 listed in file information 305, and is used for detection of database file matching and version management. The each file information 306 describes what attribute information is added to the given image file. Each file information 306 of images to be managed are listed and recorded.

The consistency confirming in step S201 of FIG. 2 is carried out to check whether or not there is any inconsistency between the information described in the file system of the management subject image file and information included in the database, and thereby detecting any update, addition or deletion of image files quickly.

Specifically, regarding the subject image files of management, a check sum of update dates, a check sum of file sizes, the number of files, a check sum of the file names are recorded in the directory information 303 of database file, similar computations are performed from the information attached to the image files recorded on the recording medium 141, and then the directory information 303 and the information attached to the image files are compared. If a full match is found as a result of the comparison, it can be determined that there is consistency between the image files recorded on the recording medium 141 and the image files managed in the database file (consistency is confirmed). On the other hand, if no match is found as a result of the comparison, it can be determined that there is inconsistency between the image files recorded on the recording medium 141 and the image files managed in the database file due to some change in the image files or database file (consistency is not confirmed).

In step S202 of FIG. 2, for example, the control unit 101 determines whether or not consistency has been confirmed as a result of the consistency confirming in step S201 of FIG. 2.

If consistency is not confirmed (i.e., inconsistency is found) as a result of the determination in step S202 of FIG. 2, the control unit 101 goes to step S203 of FIG. 2.

In step S203 of FIG. 2, for example, the control unit 101 reconstructs the database. This process involves extracting the attribute information of each management subject image file and recording the extracted information in the database again. In so doing, the directory information 303 is calculated again and the header 301 is created anew.

If consistency is confirmed in step S202 of FIG. 2 or the process of step S203 in FIG. 2 is finished, this means that a proper database has been constructed, and the control unit 101 goes to step S204 of FIG. 2.

In step S204 of FIG. 2, for example, the control unit 101 makes the display control unit 131 display a last image on the display unit 130. The last image is an image which has a file name having the largest DCF file number in a DCF directory which has the largest DCF directory number out of the images stored on the recording medium 141 according to DCF (Design rule for Camera File system) which is a storage standard for the images used by the image processing apparatus (digital camera) 100 according to the present invention. This is usually the last image photographed by the user (the last image recorded on the recording medium 141).

Next, in step S205 of FIG. 2, for example, the control unit 101 determines whether or not a favorite retrieve command has been received from the user via the operation unit 102.

If it is determined in step S205 of FIG. 2 that a favorite retrieve command has been received, the control unit 101 goes to step S206 of FIG. 2.

In step S206 of FIG. 2, for example, the control unit 101 performs a favorite retrieve (retrieve and display process of a favorite image). The favorite retrieve is intended to retrieve and view only the images with a Favorite attribute in accordance with an instruction of the user. Specifically, this process involves retrieving, from the database file, file names of images whose favorance information included in the each file information 306 is larger than 0 and reproducing only corresponding images. The attribute information of each image includes ranking information which represents a degree of favorance, specifically, numbers 0 to 5. The favorite-image retrieve is an image retrieve based on the ranking information. Detailed processing procedures of the favorite retrieve process in step S206 of FIG. 2 will be described later with reference to FIGS. 7 and 9. When the favorite retrieve process in step S206 of FIG. 2 is finished, the control unit 101 returns to step S205 of FIG. 2.

On the other hand, if it is determined in step S205 of FIG. 2 that a favorite retrieve command is received, the control unit 101 goes to step S207 of FIG. 2.

In step S207 of FIG. 2, for example, the control unit 101 determines whether or not a personal authentication retrieve command is provided from the user via the operation unit 102.

If it is determined in step S207 of FIG. 2 that a personal authentication retrieve command is provided, the control unit 101 goes to step S208 of FIG. 2.

In step S208 of FIG. 2, for example, the control unit 101 performs the consistency confirming of dictionary information. Now, the dictionary information will be described with reference to FIG. 5.

Figure 5:
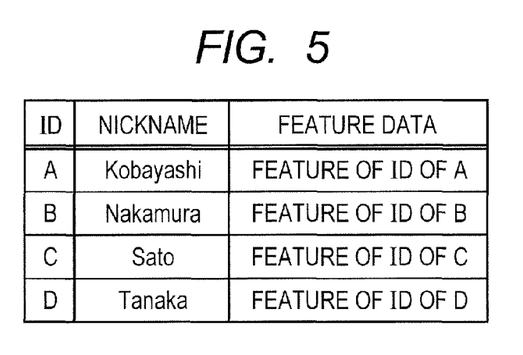
FIG. 5 is a schematic diagram showing an exemplary structure of a camera dictionary stored in the image processing apparatus (digital camera) according to the embodiment of the present invention.

FIG. 5 is a schematic diagram showing an exemplary structure of a camera dictionary stored in the image processing apparatus (digital camera) 100 according to the embodiment of the present invention. The camera dictionary is stored, for example, in a built-in non-volatile memory of the control unit 101 and is updated independently of the matching dictionary 302 and the like shown in FIG. 3. The camera dictionary shown in FIG. 5 includes an ID, a name (designation) and feature data (e.g., feature data which represents a feature value of the face of the subject) of each subject, which are associated with each other.

The image processing apparatus (digital camera) 100 according to the present invention can perform a personal authentication process using a subject. In this process, the control unit 101 calculates a degree of matching between feature data extracted from a subject and feature data stored for every ID in the camera dictionary for every ID, performs computations to determine whether the subject can be identified as the owner of the ID, and records a corresponding name retrieved from the camera dictionary as attribute information attached to the image.

The dictionary information which is part of the camera dictionary is recorded in the matching dictionary 302 in the header 301 of the database file shown in FIG. 3. Specifically, the dictionary information in the matching dictionary 302 shown in FIG. 3 includes the name registered in the camera dictionary shown in FIG. 5 by associating the name with the ID. The ID in the matching dictionary 302 does not necessarily have to be identical with the ID in the camera dictionary. When the ID in the matching dictionary 302 is associated with the each file information 306 in the file information 305, the association of each file with its name can be defined. Furthermore, in the database file shown in FIG. 3, a listed order in the matching dictionary 302 can be used as an ID without recording a special ID. In this way, since the name string itself is not recorded in the each file information 306 in the database file, the file size of the database file can be prevented from increase the size thereof largely.

An example of processes in steps S208 to S210 of FIG. 2 will be described with reference to FIGS. 3, 4, 5 and 6 in combination.

It is assumed here that the database file shown in FIG. 3 has been created in accordance with the camera dictionary shown in FIG. 5 and is subjected to a dictionary information consistency confirming in step S208 of FIG. 2.

The database file shown in FIG. 3 includes the matching dictionary 302 created with reference to the camera dictionary shown in FIG. 5. Also, the each file information 306 includes an ID described in the matching dictionary 302 and can lead to the corresponding name in the matching dictionary 302 and camera dictionary.

The file information 306 of the image file 0001.JPG (image file name: 0001.JPG) includes [1] and [4] as dictionary personal IDs. This indicates that "Kobayashi" and "Tanaka" have been added as attribute information by the matching dictionary 302. On the other hand, the file information 306 of the image file 0002.JPG (image file name: 0002.JPG) does not include a dictionary personal ID. This indicates that there is no related name. Besides, the file information 306 of the image file 2000.JPG (image file name: 2000.JPG) includes [1], [2], [3] and [4] as dictionary-based personal IDs. This indicates that "Kobayashi," "Nakamura," "Sato" and "Tanaka" have been added as attribute information by the matching dictionary 302.

Figure 6:
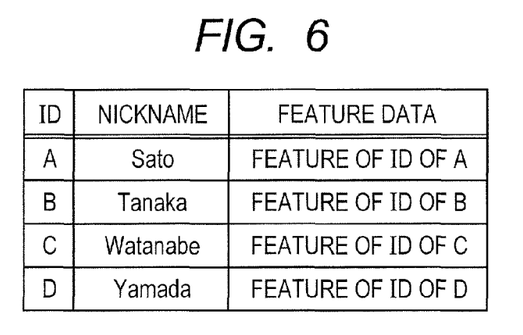
FIG. 6 is a schematic diagram showing an exemplary structure of the camera dictionary stored in the image processing apparatus (digital camera) according to the embodiment of the present invention.

It is assumed here that the control unit 101 goes to the process of step S208 of FIG. 2 after the camera dictionary is changed as shown in FIG. 6.

In this case, in step S208 of FIG. 2, the dictionary information in the matching dictionary 302 of the database file shown in FIG. 3 is compared with the dictionary information of the camera dictionary shown in FIG. 6 to check consistency, where the dictionary information in FIG. 3 has been constructed (based on the camera dictionary shown in FIG. 5) before the camera dictionary is changed. In the comparison, the names in the camera dictionary shown in FIG. 6 as well as the names in the matching dictionary 302 shown in FIG. 3 are rearranged in alphabetical order and the dictionary information is compared between the two dictionaries, beginning with the first names, to detect any addition, deletion or alteration of names in the camera dictionary. In this case, when the character strings are compared between the first name "Kobayashi" in the matching dictionary 302 (shown in FIG. 3) after the rearrangement and the first name "Sato" in the camera dictionary (shown in FIG. 6) after the rearrangement, a mismatch between the two dictionaries is detected. Alternatively, changes in the camera dictionary may be checked for by referring to a dictionary change flag set in the non-volatile memory of the control unit 101 in step S215 of FIG. 2 (described later) after a dictionary change. The dictionary change flag, when set to ON, conveys information that the camera dictionary has been changed, but consistency with the database is yet to be restored. This state corresponds to step S215 of FIG. 2 described later, in which the dictionary change flag is set to ON.

Next, in step S209 of FIG. 2, for example, the control unit 101 determines whether or not the dictionary information matches, based on a result of the dictionary information consistency confirming carried out in step S208 of FIG. 2.

If it is determined in step S209 of FIG. 2 that the dictionary information does not match (i.e., there is a mismatch), the control unit 101 goes to step S210 of FIG. 2.

In step S210 of FIG. 2, for example, the control unit 101 reconstructs the database. In so doing, the control unit 101 constructs the database file shown in FIG. 4 based on the camera dictionary shown in FIG. 6. Specifically, first the control unit 101 creates a matching dictionary 312 shown in FIG. 4 based on the camera dictionary shown in FIG. 6. Then, based on the created matching dictionary 312, the control unit 101 enters IDs from the matching dictionary in each file information 316 in file information 315, where the IDs correspond to names of respective images. Then, the reconstructed (updated) database file is stored for reuse on the recording medium 141.

Incidentally, the matching dictionary as well as the dictionary personal IDs in the file information may be updated simultaneously with the process of database reconstruction in step S203 of FIG. 2. That is, since attribute information is acquired in step S203 of FIG. 2 by analyzing images, names can be acquired at the same time. Subsequently, if the camera dictionary is not changed, consistency of the dictionary information can be maintained in step S208 of FIG. 2. On the other hand, since it takes a little bit of processing time to acquire names in step S203 of FIG. 2, names may not be acquired in step S203 of FIG. 2. In that case, consistency of the dictionary information is ensured during personal authentication retrieve.

Next, in step S211 of FIG. 2, for example, the control unit 101 clears the dictionary change flag set in the built-in non-volatile memory.

If it is determined in step S209 of FIG. 2 that the dictionary information matches or if the process of step S211 in FIG. 2 is finished, this means that a proper database with consistent dictionary information has been constructed, and the control unit 101 goes to step S212 of FIG. 2.

In step S212 of FIG. 2, for example, the control unit 101 performs a personal authentication retrieve process. The personal authentication retrieve process here is an image retrieve based on the name of a subject. Detailed processing procedures for the personal authentication retrieve process in step S212 of FIG. 2 will be described later with reference to FIGS. 8 and 9. When the personal authentication retrieve process in step S212 of FIG. 2 is finished, the control unit 101 returns to step S205 of FIG. 2.

On the other hand, if it is determined in step S207 of FIG. 2 that a personal authentication retrieve command has not been provided, the control unit 101 goes to step S213 of FIG. 2.

In step S213 of FIG. 2, for example, the control unit 101 determines whether or not a personal authentication dictionary (camera dictionary) change command has been provided from the user via the operation unit 102.

If it is determined in step S213 of FIG. 2 that a personal authentication dictionary (camera dictionary) change command has been provided, the control unit 101 goes to step S214 of FIG. 2.

In step S214 of FIG. 2, for example, the control unit 101 performs a camera dictionary change process (edit process), i.e., adds, deletes or changes names and adds or deletes persons.

Next, in step S215 of FIG. 2, for example, the control unit 101 sets the dictionary change flag in the built-in non-volatile memory (i.e., sets the dictionary change flag to ON).

When the process of step S215 in FIG. 2 is finished, the control unit 101 returns to step S205 of FIG. 2.

On the other hand, if it is determined in step S213 of FIG. 2 that a personal authentication dictionary (camera dictionary) change command has not been provided, the control unit 101 goes to step S216 of FIG. 2.

In step S216 of FIG. 2, for example, the control unit 101 performs a normal image reproduction process, i.e., switches a displayed image in accordance with an image feed, image enlargement or image reduction command from the user via the operation unit 102.

When the process of step S216 in FIG. 2 is finished, the control unit 101 returns to step S205 of FIG. 2.

Incidentally, the series of process of the flowchart shown in FIG. 2 can be suspended as a result of an interrupt such as a mode change or a press of the power button.

Figure 7:
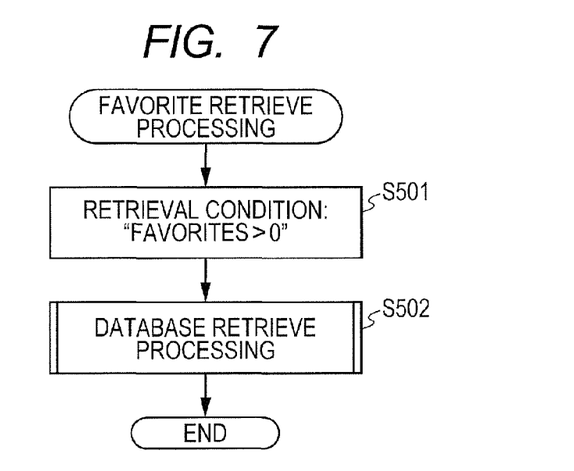
FIG. 7 is a flowchart showing an example of detailed processing procedures for a favorite retrieve process in step S206 of FIG. 2.

Next, details of the favorite retrieve process in step S206 of FIG. 2 will be described. FIG. 7 is a flowchart showing an example of detailed processing procedures for the favorite retrieve process in step S206 of FIG. 2.

First, in step S501 of FIG. 7, for example, the control unit 101 sets "favorance is greater than 0" as a condition for retrieving file information in the database file.

Next, in S502 of FIG. 7, the control unit 101 carries out a database retrieve process. In the database retrieve process in S502 of FIG. 7, the control unit 101 retrieves, by referring to the database file, file names of images whose favorance information included in the each file information is greater than 0 and retrieves only the images which satisfy the condition. Detailed processing procedures for the database retrieve process in S502 of FIG. 7 will be described later with reference to FIG. 9. Subsequently, the control unit 101 finishes the process of the flowchart shown in FIG. 7.

Next, details of the personal authentication retrieve process in step S212 of FIG. 2 will be described.

Figure 8:
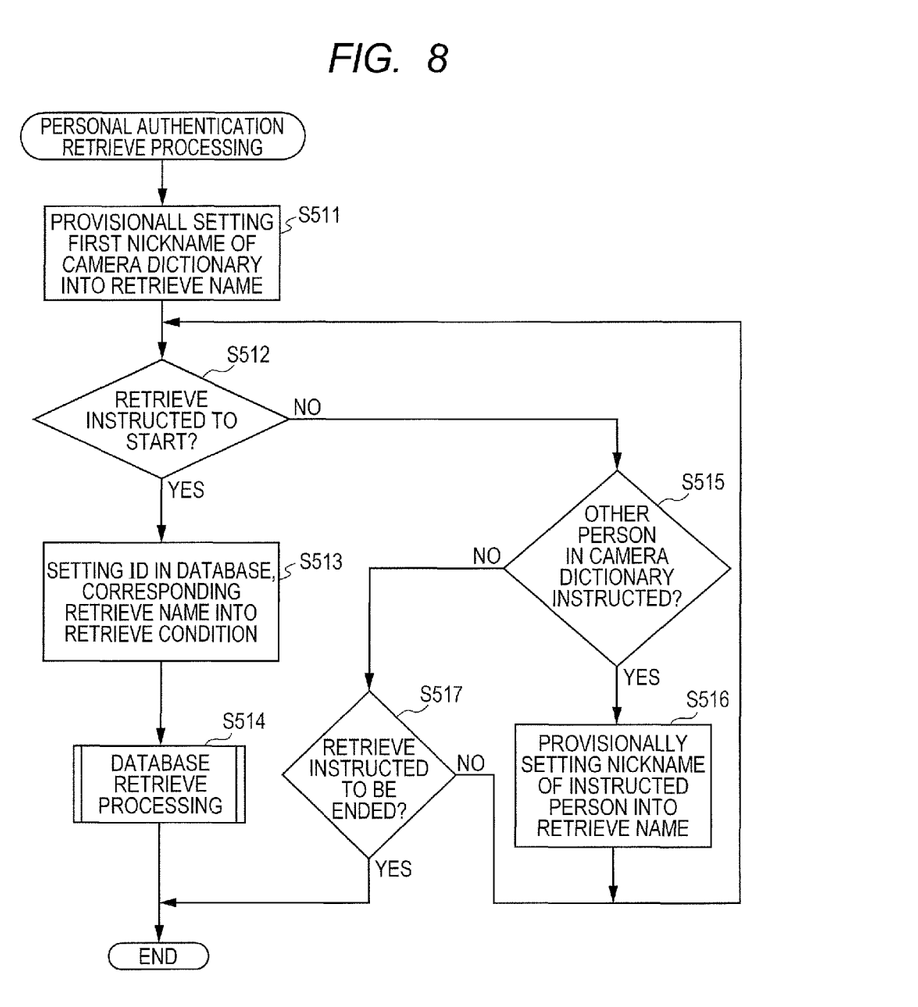
FIG. 8 is a flowchart showing an example of detailed processing procedures of a personal authentication retrieve process in step S212 of FIG. 2.

FIG. 8 is a flowchart showing an example of detailed processing procedures for the personal authentication retrieve process in step S212 of FIG. 2.

First, the control unit 101 sets a name in accordance with the instruction of the user in order to carry out a retrieve in steps S511 to S516 of FIG. 8.

Then, in step S511 of FIG. 8, for example, the control unit 101 provisionally sets the first name listed in the current camera dictionary shown in FIG. 5 or 6 as a retrieve name and presents the provisionally-set name to the user via the display unit 130.

Next, in step S512 of FIG. 8, for example, the control unit 101 determines whether or not a retrieve start command has been provided from the user via the operation unit 102.

If it is determined in step S512 of FIG. 8 that a retrieve start command has been provided, the control unit 101 goes to step S513 of FIG. 8.

Figure 4:
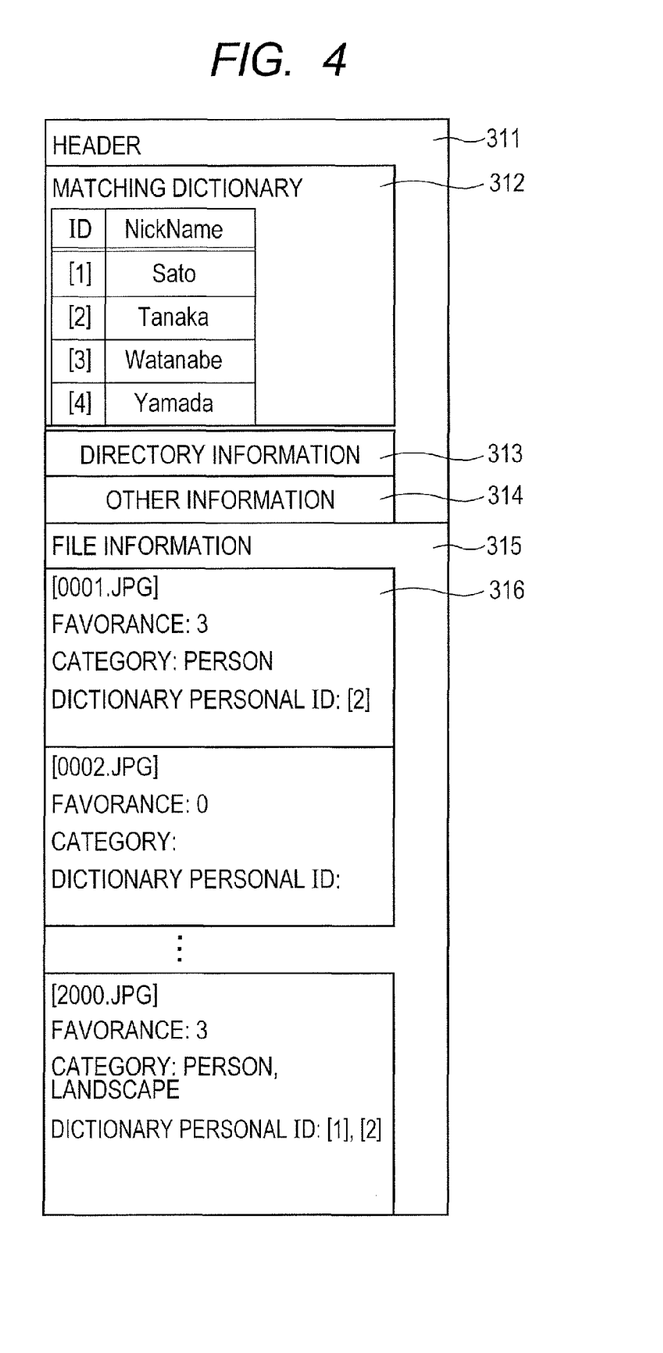
FIG. 4 is a schematic diagram showing an exemplary structure of a database file generated by the image processing apparatus (digital camera) according to the embodiment of the present invention.

In step S513 of FIG. 8, for example, the control unit 101 identifies the ID in the database file which corresponds to the retrieve name provisionally set as a name, from the matching dictionary in the current database file shown in FIG. 3 or 4.

Next, in step S514 of FIG. 8, for example, the control unit 101 carries out a database retrieve process using the ID identified in step S513 of FIG. 8, as a retrieve condition. In the database retrieve process in step S514 of FIG. 8, the control unit 101 retrieves a dictionary personal ID recorded in the each file information of the database file using the ID identified in step S513 of FIG. 8, as a retrieve condition. Specifically, the control unit 101 retrieves the file names of images including a dictionary personal ID identical to the ID identified in step S513 of FIG. 8 to extract only the images which satisfy this condition. Detailed processing procedures for the database retrieve process in step S514 of FIG. 8 will be described later with reference to FIG. 9. Subsequently, the control unit 101 finishes the process of the flowchart shown in FIG. 8.

On the other hand, if it is determined in step S512 of FIG. 8 that a retrieve start command has not been provided, the control unit 101 goes to step S515 of FIG. 8.

In step S515 of FIG. 8, for example, the control unit 101 determines whether or not another person in the camera dictionary has been specified as a retrieve target by the user via the operation unit 102.

If it is determined in S515 of FIG. 8 that another person in the camera dictionary has been specified as a retrieve target, the control unit 101 goes to step S516 of FIG. 8.

In step S516 of FIG. 8, for example, the control unit 101 provisionally sets the name of the specified person as a retrieve name and presents the provisionally-set name to the user via the display unit 130. Subsequently, the control unit 101 returns to step S512 of FIG. 8.

On the other hand, if it is determined in S515 of FIG. 8 that another person in the camera dictionary has not been specified as a retrieve target, the control unit 101 goes to step S517 of FIG. 8.

In step S517 of FIG. 8, for example, the control unit 101 determines whether or not a retrieve end command has been provided from the user via the operation unit 102.

If it is determined in S517 of FIG. 8 that a retrieve end command has been provided, the control unit 101 finishes the process of the flowchart shown in FIG. 8.

On the other hand, if it is determined in S517 of FIG. 8 that a retrieve end command has not been provided, the control unit 101 returns to step S512 of FIG. 8.

Next, details of the database retrieve process in step S502 of FIG. 7 and the database retrieve process in step S514 of FIG. 8 will be described.

Figure 9:
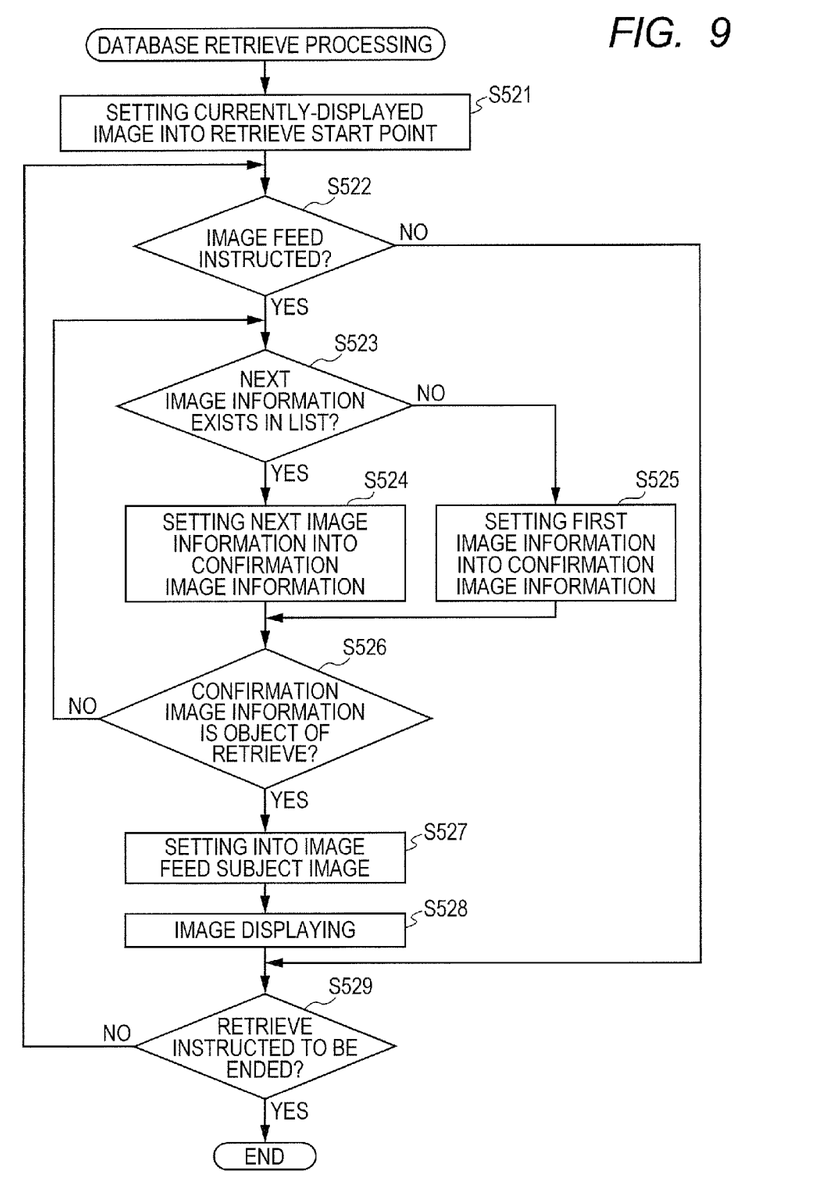
FIG. 9 is a flowchart showing an example of detailed processing procedures of a database retrieve process in step S502 of FIG. 7 and step S514 of FIG. 8.

FIG. 9 is a flowchart showing an example of detailed processing procedures of the database retrieve process in step S502 of FIG. 7 and step S514 of FIG. 8.

First, in step S521 of FIG. 9, for example, the control unit 101 sets the currently displayed image on the display unit 130 as a start-point image for a retrieve.

Next, in step S522 of FIG. 9, for example, the control unit 101 determines whether or not an image feed command (i.e., a command to display a next retrieve target image) has been provided from the user via the operation unit 102.

If it is determined in S522 of FIG. 9 that an image feed command has been provided, the control unit 101 goes to step S523 of FIG. 9.

In step S523 of FIG. 9, for example, the control unit 101 determines whether or not there is a next item of image information in the file information of the database file.

If it is determined in S523 of FIG. 9 that there is a next item of image information in the file information of the database file, the control unit 101 goes to step S524 of FIG. 9.

In step S524 of FIG. 9, for example, the control unit 101 sets the next item of image information as confirmation image information.

On the other hand, if it is determined in S523 of FIG. 9 that there is not a next item of image information in the file information of the database file, the control unit 101 goes to step S525 of FIG. 9.

In step S525 of FIG. 9, for example, the control unit 101 sets the image information at the top of list in the file information of the database file as confirmation image information.

When the process of step S524 in FIG. 9 or the process of step S525 in FIG. 9 is finished (when confirmation image information is set, i.e., when a specific item of file information in the database file is set), the control unit 101 goes to step S526 of FIG. 9.

In step S526 of FIG. 9, for example, the control unit 101 determines whether or not the confirmation image information which is set (i.e., the specific item of file information in the database file) is a retrieve target. The determination as to whether or not the confirmation image information is a retrieve target is a determination as to whether or not an attribute value of an attribute item included in the file information and used for a retrieve satisfies a retrieve condition. To take a favorite retrieve as an example, in the database file shown in FIG. 4, an attribute item "favorance" in the file information on 0001.JPG includes "3." In this case, since the image file satisfies the retrieve condition "favorance is greater than 0" in step S501 of FIG. 7, the image file is an object of retrieve.

If it is determined in step S526 of FIG. 9, that the confirmation image information which is set is not an object of retrieve, the control unit 101 returns to step S523 of FIG. 9.

On the other hand, if it is determined in step S526 of FIG. 9, that the confirmation image information which is set is an object of retrieve, the control unit 101 goes to step S527 of FIG. 9.

In step S527 of FIG. 9, for example, the control unit 101 sets that image in the recording medium 141 which is related to the set confirmation image information, as an object image of an image feed.

Next, in step S528 of FIG. 9, for example, the control unit 101 makes the display control unit 131 display the object image of an image feed set in step S527 of FIG. 9 on the display unit 130.

When the process of step S528 in FIG. 9 is finished or if it is determined in S522 of FIG. 9 that an image feed command has not been provided, the control unit 101 goes to step S529 of FIG. 9.

In step S529 of FIG. 9, for example, the control unit 101 determines whether or not a retrieve end command has been provided from the user via the operation unit 102.

If it is determined in step S529 of FIG. 9 that a retrieve end command has been provided, the control unit 101 finishes the process of the flowchart shown in FIG. 9.

On the other hand, if it is determined in step S529 of FIG. 9 that a retrieve end command has not been provided, the control unit 101 returns to step S522 of FIG. 9.

Incidentally, although an image feed process has been described with reference to the flowchart shown in FIG. 9, it is obvious that the processing procedures of the flowchart are also applicable to an image return process, i.e., the process of displaying a previous retrieve target image.

Also, although in the example described above, the matching dictionaries 302 and 312 shown in FIGS. 3 and 4 are created by extracting names from the camera dictionaries shown in FIGS. 5 and 6, respectively, the embodiment of the present invention is not limited to this form. For example, instead of names in the camera dictionaries, the matching dictionaries may be created by extracting feature data or by extracting names and feature data from the camera dictionaries.

Also, although in the embodiment described above, the processes in FIGS. 2 and 7 to 9 are performed in reproduction mode (i.e., upon activation of the reproduction mode or upon transition to the reproduction mode), the embodiment of the present invention is not limited to this form. The processes in FIGS. 2 and 7 to 9 may be performed not only in the reproduction mode, but also, under predetermined operating conditions in which at least the database is likely to be retrieved, such as when the image processing apparatus 100 is powered on or when a command to perform a database retrieve is issued.

With the image processing apparatus 100 according to the present embodiment, the camera dictionary configured to be updatable is stored in the built-in non-volatile memory of the control unit 101. As shown in FIGS. 5 and 6, the camera dictionary is configured by associating names of subjects (information of designations of subjects) with feature data (feature information) which represent features of the subjects.

Also, with the image processing apparatus 100 according to the present embodiment a database is stored in the memory 104 or recording medium 141. As shown in FIGS. 3 and 4, the database includes a matching dictionary and file information, where the matching dictionary includes the name of each subject included in the camera dictionary, with an ID (identifier) added to the name, while the file information, which is information about each image file, relates information about the subject existing in the image file (dictionary personal ID) with the ID. Also, the control unit 101 checks consistency between information in the matching dictionary and corresponding information in the camera dictionary (S208 of FIG. 2). The control unit 101 which carries out the consistency confirming serves as a consistency confirming unit.

If any inconsistency is found as a result of the consistency confirming, the control unit 101 reconstructs the database when retrieve of the database is possible to be performed (S210 of FIG. 2). The control unit 101 which reconstructs the database serves as a reconstruction unit.

As described above, with the image processing apparatus 100 according to the present embodiment, attribute information of all the image files recorded on the recording medium 141 is managed in the database. Thus, the file information in the database includes IDs as information (dictionary personal IDs) used to identify the persons in the images.

In this way, since the ID is used for management in the database, the database is made compact (i.e., suppress that the database largely increases the size thereof) and the load of a retrieve process is made lighter than in the case of a simple string retrieve. That is, since a name string retrieve set on a UI is carried out in a form of retrieve of an ID associated with the name, no sequential string comparisons is performed in the retrieve. Also, since the size of the database to be retrieved is kept down, a retrieve can be carried out faster than in the case of string comparisons. Also, normal user operation, such as retrieving of an image based on name performed in a digital camera which has photographed the image, can be performed as usual. Besides, by retrieving the database using the name of a subject selected from the names of the subjects included in the camera dictionary, the object of retrieve can be limited to the subjects in the camera dictionary, contributing to speeding up the retrieves.

Also, when the camera dictionary is updated, since the camera dictionary becomes inconsistent with the matching dictionary in the database as well as with the attribute information of the image files in the database, a process is required to make the camera dictionary match (consistent with) the matching dictionary and attribute information in the database.

However, updating the entire database each time the camera dictionary is updated involves an extraordinary processing load. Also, this is likely to involve the inconvenience of being unable to take photos during a database update.

Thus, according to the embodiment of the present invention, updating the database when there is inconsistency is performed under predetermined operating conditions in which at least the database is likely to be retrieved, such as when the reproduction mode is on (i.e., upon activation of the reproduction mode or upon transition to the reproduction mode), when the image processing apparatus 100 is powered on, or when a command to perform a database retrieve is issued.

Also, with the image processing apparatus 100 according to the present embodiment, even after the camera dictionary is changed (updated), the consistency of the database can be maintained. Also, with the image processing apparatus 100 according to the present embodiment, changes in (updates of) the camera dictionary are detected only during retrieves related to personal authentication (S207 and S208 of FIG. 2), processes such as retrieves of favorite images are not affected by the changes in the camera dictionary.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-289479, filed on Dec. 28, 2011, which is hereby incorporated by reference herein in its entirety.

What is claimed is:

1. An image processing apparatus comprising:
a controller configured to manage first dictionary data consisting of a name of a subject and feature information indicating a feature of the subject, second dictionary data in which an identifier is added to at least one of the information of the name of the subject and the feature information indicating a feature of the subject included in the first dictionary data, and a database including file information which is information of an image file and related information about the subject existing in the image file with the identifier stored in a memory;
a consistency confirming unit configured to check consistency between the information in the second dictionary data and the information in the first dictionary data; and
a reconstruction unit configured to reconstruct the database in a case where any inconsistency is found by the consistency confirming unit.

2. The image processing apparatus according to claim 1, wherein reconstruction by the reconstruction unit is performed at one of a time when the image processing apparatus is powered on, a time when a reproduction mode for reproducing an image file recorded on a recording medium is activated, a time when a transition to the reproduction mode takes place, and a time when a command to retrieve the database is issued.

3. The image processing apparatus according to claim 1, further comprising a retrieve unit configured to retrieve the database by setting the identifier of the subject to be retrieved as a retrieve condition if consistency is found by the consistency confirming unit or if inconsistency is found by the consistency confirming unit and the database is reconstructed by the reconstruction unit.

4. The image processing apparatus according to claim 3, wherein the retrieve unit retrieves the database based on information of the name of a subject selected from the information of the names of the subjects included in the first dictionary data.

5. The image processing apparatus according to claim 1, wherein the feature information indicating a feature of the subject represents a feature of a face of the subject.

6. The image processing apparatus according to claim 1, wherein:
the second dictionary data is constructed such that an ID is added as the identifier on a subject basis to the information of the name of the subject included in the first dictionary data;
the file information is constructed by relating information about the subject existing in the image file with the ID; and
the consistency confirming unit checks consistency between the information of the name of the subject included in the second dictionary data and the information of the name of the subject included in the first dictionary data.

7. The image processing apparatus according to claim 1, wherein:
the second dictionary data is constructed such that an ID is added as the identifier on a subject basis to the information indicating the feature of the subject included in the first dictionary data;
the file information is constructed by relating information about the subject existing in the image file with the ID; and
the consistency confirming unit checks consistency between the feature information indicating the feature of the subject included in the second dictionary data and the feature information about the feature of the subject included in the first dictionary data.

8. The image processing apparatus according to claim 1, wherein the first dictionary data is updatable independently of the second dictionary data.

9. A method for controlling an image processing apparatus, comprising:
managing first dictionary data consisting of a name of a subject and feature information indicating a feature of the subject, second dictionary data in which an identifier is added to at least one of the information of the name of the subject and the feature information indicating a feature of the subject included in the first dictionary data, and a database including file information which is information of an image file and related information about the subject existing in the image file with the identifier, stored in a memory;
checking consistency between the information in the second dictionary data and the information in the first dictionary data; and
reconstructing the database in a case where any inconsistency is found by the checking.

10. The method for controlling an image processing apparatus according to claim 9, wherein reconstruction by the reconstructing step is performed at one of a time when the image processing apparatus is powered on, a time when a reproduction mode for reproducing an image file recorded on a recording medium is activated, a time when a transition to the reproduction mode takes place, and a time when a command to retrieve the database is issued.

11. The method for controlling an image processing apparatus according to claim 9, further comprising retrieving the database by setting the identifier of the subject to be retrieved as a retrieve condition if consistency is found by the checking or if inconsistency is found by the checking and the database is reconstructed by the reconstructing.

12. The method for controlling an image processing apparatus according to claim 9, wherein the retrieving retrieves the database based on information of the name of a subject selected from the information of the names of the subjects included in the first dictionary data.

13. The method for controlling an image processing apparatus according to claim 9, wherein the feature information indicating a feature of the subject represents a feature of a face of the subject.

14. A non-transitory computer-readable storage medium storing a computer program comprising a program code for causing a computer to execute the control method according to claim 9.

15. An image processing apparatus comprising:
 a controller configured to manage dictionary data consisting of a name of a subject and feature information indicating a feature of the subject, matching information in which an identifier is added to the name of the subject in the dictionary data, and a database including file information which is information of an image file and related information about the subject existing in the image file with the identifier, stored in a memory; and
 a reconstruction unit configured to reconstruct the matching information and the database in accordance with the name in the dictionary data being changed under control of the controller.

16. The image processing apparatus according to claim 15, wherein reconstruction by the reconstruction unit is performed at one of a time when the image processing apparatus is powered on, a time when a reproduction mode for reproducing an image file recorded on a recording medium is activated, a time when a transition to the reproduction mode takes place, and a time when a command to retrieve the database is issued.

17. The image processing apparatus according to claim 15, further comprising a retrieve unit configured to retrieve the database by setting the identifier of the subject to be retrieved as a retrieve condition if the database is reconstructed by the reconstruction unit.

18. The image processing apparatus according to claim 17, wherein the retrieve unit retrieves the database based on information of the name of a subject selected from the information of the names of the subjects included in the dictionary data.

19. The image processing apparatus according to claim 15, wherein the feature information indicating a feature of the subject represents a feature of a face of the subject.

20. A control method of an image processing apparatus, comprising:
 managing dictionary data consisting of a name of a subject and feature information indicating a feature of the subject, matching information in which an identifier is added to the name of the subject in the dictionary data, and database including file information which is information of an image file and related information about the subject existing in the image file with the identifier, stored in a memory; and
 reconstructing the matching information and the database in accordance with the name in the dictionary data being changed in the managing.

21. The method for controlling an image processing apparatus according to claim 20, wherein reconstruction in the reconstructing step is performed at one of a time when the image processing apparatus is powered on, a time when a reproduction mode for reproducing an image file recorded on a recording medium is activated, a time when a transition to the reproduction mode takes place, and a time when a command to retrieve the database is issued.

22. The method of controlling an image processing apparatus according to claim 20, further comprising retrieving the database by setting the identifier of the subject to be retrieved as a retrieve condition if the database is reconstructed in the reconstructing step.

23. The image processing apparatus according to claim 22, wherein the retrieving retrieves the database based on information of the name of a subject selected from the information of the names of the subjects included in the dictionary data.

24. The image processing apparatus according to claim 20, wherein the feature information indicating a feature of the subject represents a feature of a face of the subject.

25. A non-transitory computer-readable storage medium storing a computer program comprising a program code for causing a computer to execute the control method according to claim 20.

* * * * *